(12) United States Patent
Anderson et al.

(10) Patent No.: US 6,856,386 B2
(45) Date of Patent: Feb. 15, 2005

(54) SINGLE SWEEP POLARIZATION DEPENDENT LOSS MEASUREMENT

(75) Inventors: Duwayne R. Anderson, St. Helens, OR (US); Shailesh Singh, Beaverton, OR (US)

(73) Assignee: Thorlabs, Inc., Newton, NJ (US)

( * ) Notice: Subject to any disclaimer, the term of this patent is extended or adjusted under 35 U.S.C. 154(b) by 0 days.

(21) Appl. No.: 10/393,642

(22) Filed: Mar. 21, 2003

(65) Prior Publication Data

US 2004/0184029 A1 Sep. 23, 2004

(51) Int. Cl.⁷ .............................................. G01N 21/00
(52) U.S. Cl. ...................................................... 356/73.1
(58) Field of Search ........................ 356/73.1, 346–351, 356/364–367

(56) References Cited

U.S. PATENT DOCUMENTS

| | | | |
|---|---|---|---|
| 4,897,543 A | * | 1/1990 | Kersey .................. 250/227.27 |
| 5,227,623 A | | 7/1993 | Heffner |
| 5,298,972 A | | 3/1994 | Heffner |
| 5,371,597 A | | 12/1994 | Favin et al. |
| 6,204,924 B1 | * | 3/2001 | Cyr .............................. 356/453 |

FOREIGN PATENT DOCUMENTS

| | | | | |
|---|---|---|---|---|
| EP | 1 191 320 A1 | 3/2002 | .......... | G01M/11/00 |
| WO | 03/021821 A1 | 3/2003 | ........... | H04B/10/18 |

OTHER PUBLICATIONS

Egbert Krause, Jens Peupelmann, Adalbert Bandemer, Christian Schaffer, "IMHz High Speed Fiber–Inline–Polarimeter", 28$^{th}$ European Conference on Optical Communication Sep. 12, 2002.

Craig, R. M. "Accurate Spectral Characterization of Polarization–Dependent Loss," *Journal of Lightwave Technology*, vol. 21, No. 2, pp. 432–437 (Feb. 2003).

* cited by examiner

*Primary Examiner*—Tu T. Nguyen
(74) *Attorney, Agent, or Firm*—Finnegan, Henderson, Farabow, Garrett & Dunner

(57) ABSTRACT

A polarization scan module is presented. The polarization scan module according to some embodiments of the present invention includes a swept-wavelength optical source providing a light signal that sweeps over a range of optical wavelengths, the light signal having a state of polarization; and a polarization rotator that rotates the state of polarization over a Poincare sphere as the light signal wavelength is swept within the range to produce a test optical signal. A single sweep polarization dependent loss measurement can be achieved with some embodiments of the present invention. In some embodiments, measurements of the state of polarization and optical power at the input and output of an optical component being tested together with the known optical wavelength for the state of polarization, taken at four different polarizations, can provide a set of measurement data that can be used to compute the polarization dependent loss.

23 Claims, 3 Drawing Sheets

SINGLE SWEEP POLARIZATION DEPENDENT LOSS MEASUREMENT

BACKGROUND OF THE INVENTION

The present invention relates to the measurement of optical characteristics of components, and more particularly to a single sweep polarization dependent loss (PDL) measurement method and apparatus using a swept-wavelength system.

There currently are basically three approaches for measuring the PDL of a passive optical component.

Use four well-known states of polarization at the input of the optical component, sweep a range of wavelengths for each state of polarization, and measure the transmitted optical power through the component over each sweep. This is known as the Mueller matrix method and is described in U.S. Pat. No. 5,371,597.

Use three well-known states of polarizaton at the input of the optical component, sweep a range of wavelengths for each state of polarization, and measure the Jones vector of the light that is transmitted through the component for each sweep. This is known as the Jones matrix method and is described in U.S. Pat. Nos. 5,298,972 and 5,227,623.

Use random states of polarization at the input of the optical component and measure the transmitted optical power for each random state. This is a well-known method that is described in *Fiber Optic Test and Measurement* by Dennis Derickson, page 354, published Oct. 8, 1997 by Prentice Hall. Mathematical algorithms are then applied to these data to determine the PDL —see for example TIA/EIA FOTP-157, Measurement of Polarization-Dependent Loss (PDL) of Single-Mode Fiber Optic Components.

Each of these techniques require multiple measurements taken in sequence, i.e., in sequential sweeps, at different states of polarization (SOP).

What is desired is a simple PDL measurement technique that is robust and reduces the measurement time.

BRIEF SUMMARY OF THE INVENTION

Accordingly the present invention provides a single sweep polarization dependent loss measurement by causing a state of polarization of a test light source to rotate over a Poincare sphere as a function of optical wavelength of the test light source as a range of optical wavelengths is swept. Measurements of the state of polarization and optical power at the input and output of an optical component being tested together with the known optical wavelength for the state of polarization, taken at four different orientations of the state of polarization, provide a set of measurement data that is used to compute the polarization dependent loss for the optical component. A polarization scan module, in either an all-passive or active configuration, is used to produce the state of polarization as a function of optical wavelength for the test light source. The polarization scan module includes a swept-wavelength optical source and either an active polarization controller or passive optical elements to provide the rotation of the state of polarization over the Poincare sphere as a function of optical wavelength. The passive elements may be either polarization maintaining fibers oriented approximately at 45° to the respective eigen states of each other and the optical source, the PMFs having different optical lengths, or optical splitter/multiplexer pairs having different optical path lengths between the splitter and multiplexer in each pair, the difference between path lengths being different in each pair.

The objects, advantages and other novel features of the present invention are apparent from the following detailed description when read in conjunction with the appended claims and attached drawing.

DETAILED DESCRIPTION OF THE INVENTION

A single sweep polarization dependent loss measurement according to embodiments of the present invention can be achieved by causing a state of polarization of a test light source to rotate over a Poincare sphere as a function of optical wavelength of the test light source as a range of optical wavelengths is swept. Measurements of the state of polarization and optical power at the input and output of an optical component being tested together with the known optical wavelength for the state of polarization, taken at four different orientations of the state of polarization, provide a set of measurement data that can be used to compute the polarization dependent loss for the optical component. A polarization scan module, in either an all-passive or active configuration, can be used to produce the state of polarization as a function of optical wavelength for the test light source. A polarization scan module according to the present invention can includes a swept-wavelength optical source and either an active polarization controller or passive optical elements to provide the rotation of the state of polarization over the Poincare sphere as a function of optical wavelength. An embodiment of passive element can be either polarization maintaining fibers oriented preferably at about 45° to the respective eigen states of each other and the optical source, the PMFs having different optical lengths, or an optical splitter/multiplexer pair having different optical path lengths between the splitter and multiplexer in each pair, the difference between oath lengths being different in each pair. The relative orientation and lengths can be chosen such that the state of polarization rotates over the Poincare sphere.

Figure 1:
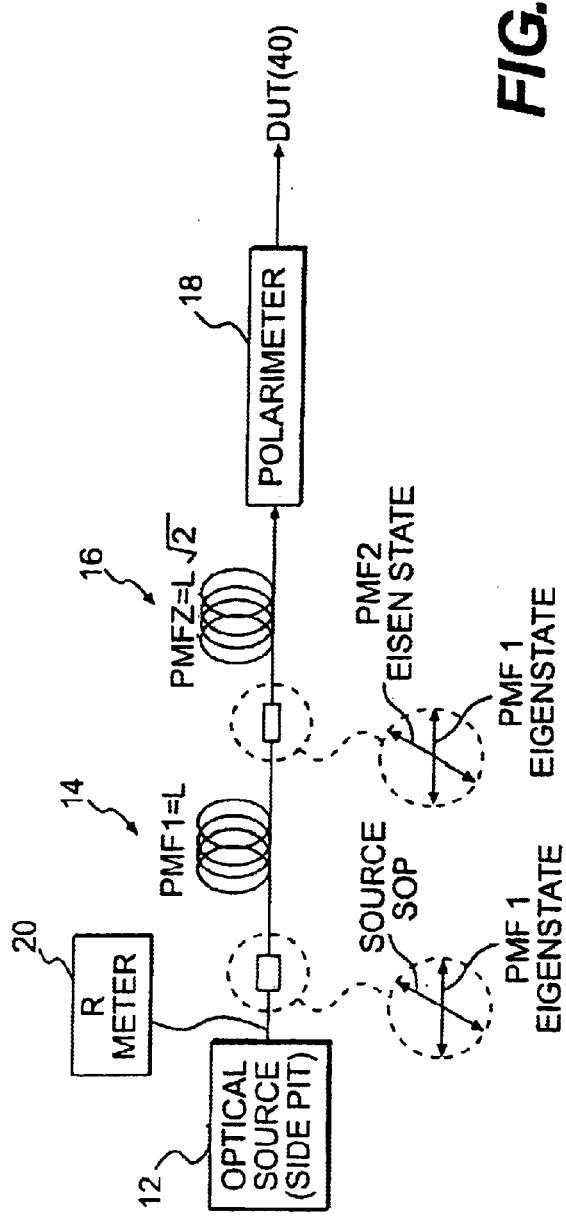
FIG. 1 is a block diagram view of a polarization scan module for a single sweep PDL measurement system according to the present invention.
Figure 4:
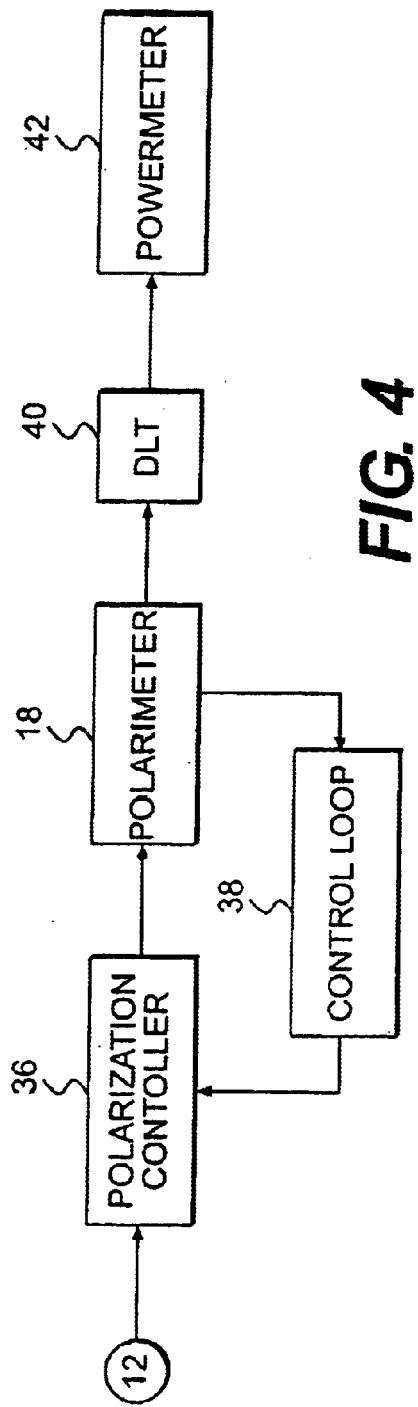
FIG. 4 is a block diagram view of a single sweep PDL measurement system using an active polarization controller according to the present invention.

Referring now to FIG. 1 an all-passive configuration is shown in which the state of polarization (SOP) of input light from a tunable laser 12, or other swept-wavelength optical source, is input at preferably about 45° to the eigenstates of a first section of polarization-maintaining fiber (PMF) 14. The first section of PMF 14 is spliced with its eigenstates at preferably about 45° to the eigenstates of a second section of PMF 16. The length of the first section of PMF 14 is L and the length of the second section of PMF 16 is preferably L*SQRT(2). The nature of the two sections of PMF 14,16, i.e., their relative orientations and lengths, is such that the state of polarization rotates over a Poincare sphere as the wavelength of the input light from the tunable laser 12 changes. The output of the second section of PMF 16 is input to an in-line, fast polarimeter 18, such as that described in 1 MHz High Speed Fiber-Inline-Polarimeter by Egbert Krause, et al presented at the $28^{th}$ European Conference on Optical Communication, Sep. 12, 2002, the output of which is applied to an optical component being tested (DUT) 40 (FIG. 4). The optical source 12 and two sections of PMF 14, 16 form a polarization scan module (PSM).

Figure 2:
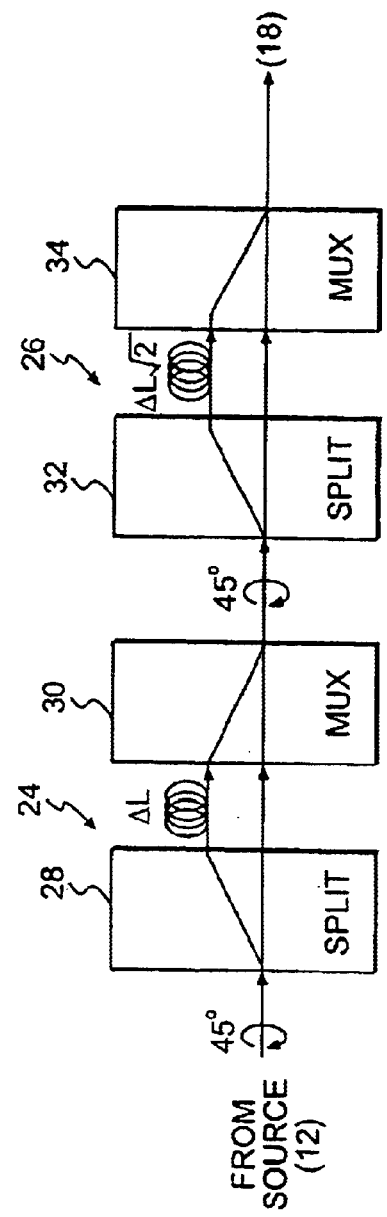
FIG. 2 is a block diagram view of an alternate single sweep PDL measurement system according to the present invention.

Due to the cost of the PMF another configuration is shown in FIG. 2. Here the input light is linearly polarized and oriented at preferably about 45° with respect to the eigenstates of a first stage 24. The input light is split into its respective linear states of polarization, S and P, by a first optical splitter 28, with one of the states being taken through an extra length ΔL of fiber before being recombined with a first polarization multiplexer 30. The output from the first stage 24 is spliced to the input of a second stage 26 with the eigenstates between the two stages being oriented at preferably about 45° to each other. A second optical splitter 32 and a second polarization multiplexer 34 complete the second stage 26. The differential length of the two polarization paths in stage 26 is preferably SQRT(2) times the differential length in the first stage 24. The recombined output from the second polarization multiplexer 34 is input to the polarimeter 18. The output from the polarimeter 18 is applied to the DUT 40. The nature of the two stages 24, 26, i.e., their relative orientations and length differentials, is such that the state of polarization rotates over a Poincare sphere as the wavelength of the input light from the tunable laser 12 changes.

For both embodiments the entire operation works within a swept wavelength system so the input light is of changing wavelength, and the exact wavelength is known from a swept wavelength meter 20, such as that described in U.S. patent application Ser. No. 09/774,433, at the output of the tunable laser 12. The transmission coefficients are obtained by knowing with high accuracy the power transmitted through the DUT 40 using an optical power meter 42 (FIG. 4) and the power measured at the input by the fast polarimeter 18.

This technique is similar to the Mueller matrix method with the exception that the four states of polarization are essentially random variables that are measured by the fast polarimeter 18. The PDL of an optical component is determined by the top row of the component's Mueller matrix:

$$PDL=10*\log\{(m_{0,0}+SQRT(m_{0,1}^2+m_{0,2}^2+m_{0,3}^2))/(m_{0,0}-SQRT(m_{0,1}^2+m_{0,2}^2+m_{0,3}^2))\} \quad (1)$$

where $m_{0,x}$ are the elements of the DUT Mueller matrix.

Typically the elements of the Mueller matrix are found by measuring the transmission coefficients of the DUT 40 at four orthogonal states of polarization, i.e., the elements of the Mueller matrix may be expressed as:

$$m_{0,0}=(T_0+T_1)/2;\ m_{0,1}=(T_0-T_1)/2;\ m_{0,j}=T_j-m_{0,0}$$

where j=2, 3 and $T_x$ are transmission coefficients for linear horizontal, linear vertical, linear+45° and right-circular polarized light. Other orthogonal Stokes vectors representing the different states of polarization may also be used.

Also known is that any set of non-identical Stokes vectors may be used, as long as all four Stokes vectors are known and are not in a common plane:

$$\begin{vmatrix} S0_0 & S0_1 & S0_2 & S0_3 \\ S1_0 & S1_1 & S1_2 & S1_3 \\ S2_0 & S2_1 & S2_2 & S2_3 \\ S3_0 & S3_1 & S3_2 & S3_3 \end{vmatrix} * \begin{vmatrix} m_{0,0} \\ m_{0,1} \\ m_{0,2} \\ m_{0,3} \end{vmatrix} = \begin{vmatrix} P0 \\ P1 \\ P2 \\ P3 \end{vmatrix} \quad (2)$$

The top row elements of the Mueller matrix are determined by taking the inverse of the four-by-four matrix:

$$\begin{vmatrix} m_{0,0} \\ m_{0,1} \\ m_{0,2} \\ m_{0,3} \end{vmatrix} = INV \begin{vmatrix} S0_0 & S0_1 & S0_2 & S0_3 \\ S1_0 & S1_1 & S1_2 & S1_3 \\ S2_0 & S2_1 & S2_2 & S2_3 \\ S3_0 & S3_1 & S3_2 & S3_3 \end{vmatrix} * \begin{vmatrix} P0 \\ P1 \\ P2 \\ P3 \end{vmatrix} \quad (3)$$

From this equation it is apparent that the requirement for all four Stokes vectors not being in the same plane is equivalent to the requirement that the four-by-four matrix not be singular. Based on equation (3) the PDL may be determined by measuring the power transmitted through the DUT 40 at essentially any four randomly selected states of polarization subject to the constraint described above, i.e., the four states are not all in the same plane.

Figure 3:
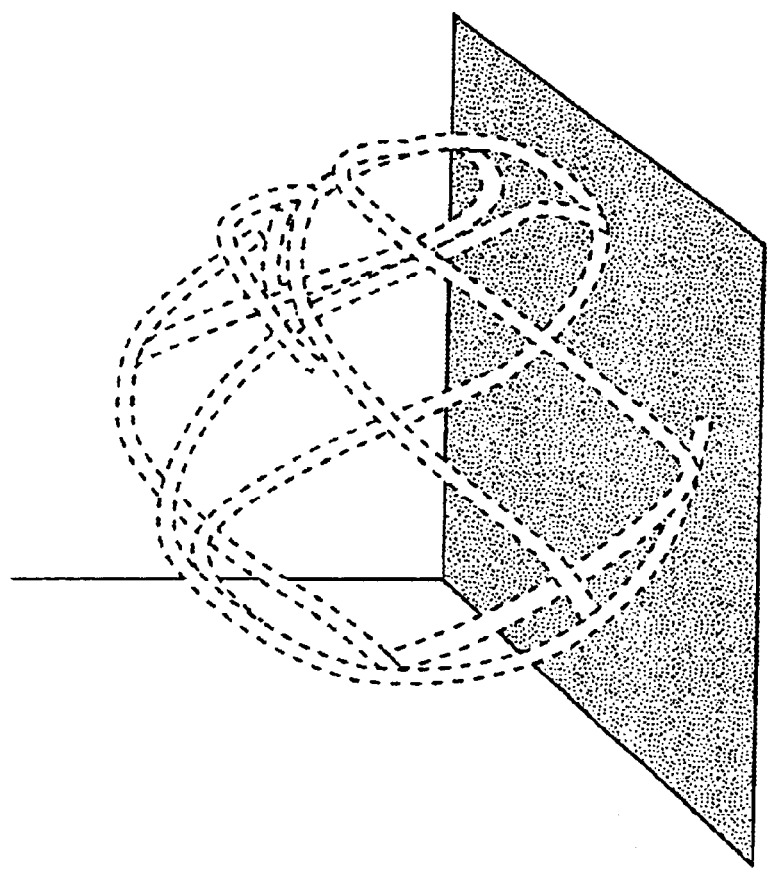
FIG. 3 is a graphic view illustrating rotation of the Stokes vector on a Poincare sphere as a function of wavelength.
Figure 5:
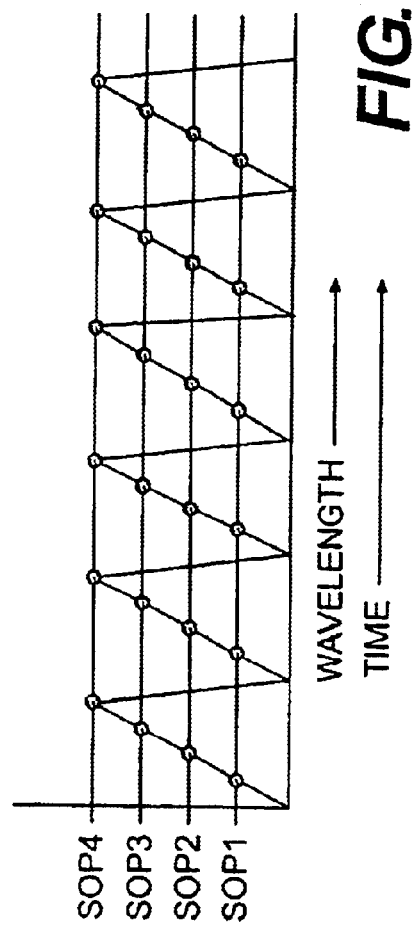
FIG. 5 is a graphic view of state of polarization versus wavelength for the system of FIG. 4.

For a particular example the Stokes vector may rotate about 45° or more over a Poincare sphere for a one picometer change in wavelength. The rotation of the Stokes vector is illustrated in FIG. 3. Thus the SOP may be made to rotate automatically in a swept laser system using an all passive design. FIG. 5 illustrates how the SOP changes with wavelength over a single sweep scan.

The PDL measurement system also may be implemented using an active polarization controller as the polarization scan module, as shown in FIG. 4. A polarization controller 36 is used to change the polarization of an input light signal before input to the high-speed polarimeter 18. A conventional control loop 38 coupled between the polarimeter 18 and the polarization controller 36. The control loop 38 ensures that the polarization controller 36 is set to the same four different states of polarization in sequence to insure that the four states of polarization are not in the same plane. Also, although any four states of polarization not in the same plane may be used, in practice the noise performance is improved if the four states are as far apart as possible on the Poincare sphere. This is a key advantage for the active method. Therefore the state of polarization (SOP) from the polarimeter 18 changes between four pre-defined states sequentially and cyclically during a single scan, roughly tracing out a quarter hemisphere on the Poincare sphere. The SOP is known with great accuracy because of the polarimeter 18 at the input of the DUT 40.

In either case, active or all-passive, the PDL measurement system uses a high-speed polarimeter 18 that accurately measures the Stokes vector representing the state of polarization as the wavelength changes. A design for a passive, all-fiber polarimeter exists, with speed limited only by the electronics of the photodetectors. See for example Westbrook, P.S., et al, *In-Line Polarimeter Using Blazed Fiber Gratings*, IEEE Photonics Technology Letters, Vol. 12, No. 10, October 2000: Bouzid, A., et al, *Fiber-Optic Four-Detector Polarimeter*, Optics Communications 118 (1995) 329–334; Westbrook, P., *All-Fiber Polarization Monitoring and System Applications*, OFC'02, WJ1-1; Kraus, E., *New Accurate Calibration Procedure for a Four Detector Polarimeter*, DRA Technical Notebook, OPT10, pp 67–68; Krause, E., et al, 1 *MHz High Speed Fiber-Inline-Polarimeter*, $28^{th}$ European Conference on Optical Communication, Sep. 12, 2002.

Conceptually the measurement process uses the following procedure:

1. At a start wavelength measure the Stokes vector (state of polarization) and transmitted optical power.
2. Index the wavelength, typically by about one picometer, to cause the Stokes vector to rotate in a passive implementation. For an active implementation the active polarization controller changes the state of polarization. Measure the new Stokes vector and new transmitted optical power.
3. Repeat step 2 until four Stokes vectors and four optical powers have been measured.
4. Use the data from steps 2 and 3 in equation (3) to measure the top-row elements of the Mueller matrix, from which the PDL is then calculated using equation (1).

This procedure works fine so long as the PDL does not change over the sweep of four wavelengths used to rotate the Stokes vector. Since the change in wavelength is only about four picometers in this example, for most DUTs this procedure is fine.

If the DUT has strong PDL dependence with wavelength, as it does in the edges of dense wavelength division multiplexing (DWDM) filters, this procedure is still useful with the assumption that the elements of the Mueller matrix change linearly over eight wavelength steps—four top-row elements of the Mueller matrix and four rates of change for the top-row elements of the Mueller matrix. The equation for this procedure is:

$$\begin{vmatrix} S0_0 & 0 & S0_1 & 0 & S0_2 & 0 & S0_3 & 0 \\ S1_0 & \Delta\lambda_1*S1_0 & S1_1 & \Delta\lambda_1*S1_1 & S1_2 & \Delta\lambda_1*S1_2 & S1_3 & \Delta\lambda_1*S1_3 \\ S2_0 & \Delta\lambda_2*S2_0 & S2_1 & \Delta\lambda_2*S2_1 & S2_2 & \Delta\lambda_2*S2_2 & S2_3 & \Delta\lambda_2*S2_3 \\ S3_0 & \Delta\lambda_3*S3_0 & S3_1 & \Delta\lambda_3*S3_1 & S3_2 & \Delta\lambda_3*S3_2 & S3_3 & \Delta\lambda_3*S3_3 \\ S4_0 & \Delta\lambda_4*S4_0 & S4_1 & \Delta\lambda_4*S4_1 & S4_2 & \Delta\lambda_4*S4_2 & S4_3 & \Delta\lambda_4*S4_3 \\ S5_0 & \Delta\lambda_5*S5_0 & S5_1 & \Delta\lambda_5*S5_1 & S5_2 & \Delta\lambda_5*S5_2 & S5_3 & \Delta\lambda_5*S5_3 \\ S6_0 & \Delta\lambda_6*S6_0 & S6_1 & \Delta\lambda_6*S6_1 & S6_2 & \Delta\lambda_6*S6_2 & S6_3 & \Delta\lambda_6*S6_3 \\ S7_0 & \Delta\lambda_7*S7_0 & S7_1 & \Delta\lambda_7*S7_1 & S7_2 & \Delta\lambda_7*S7_2 & S7_3 & \Delta\lambda_7*S7_3 \end{vmatrix} * \begin{vmatrix} m_{0,0} \\ \Delta_{0,0} \\ m_{0,1} \\ \Delta_{0,1} \\ m_{0,2} \\ \Delta_{0,2} \\ m_{0,3} \\ \Delta_{0,3} \end{vmatrix} = \begin{vmatrix} P0 \\ P1 \\ P2 \\ P3 \\ P4 \\ P5 \\ P6 \\ P7 \end{vmatrix} \quad \text{Eq.(4)}$$

where $\Delta\lambda_x$ is the change in wavelength between successive states of polarization, i.e., between $S_{x-1}$ and $S_x$. In equation (4) all the components of the Stokes vectors are known because of the in-line polarimeter 18, and the wavelength steps, which don't have to be in even increments, are known because the swept wavelength meter 20 calibrates the system accurately to less than one picometer RMS error. The transmitted power measurements P also are known. Consequently this equation may be solved for the unknown elements of the Mueller matrix and their slopes by taking the inverse of the Stokes matrix:

$$\begin{vmatrix} m_{0,0} \\ \Delta_{0,0} \\ m_{0,1} \\ \Delta_{0,1} \\ m_{0,2} \\ \Delta_{0,2} \\ m_{0,3} \\ \Delta_{0,3} \end{vmatrix} = INV \begin{vmatrix} S0_0 & 0 & S0_1 & 0 & S0_2 & 0 & S0_3 & 0 \\ S1_0 & \Delta\lambda_1*S1_0 & S1_1 & \Delta\lambda_1*S1_1 & S1_2 & \Delta\lambda_1*S1_2 & S1_3 & \Delta\lambda_1*S1_3 \\ S2_0 & \Delta\lambda_2*S2_0 & S2_1 & \Delta\lambda_2*S2_1 & S2_2 & \Delta\lambda_2*S2_2 & S2_3 & \Delta\lambda_2*S2_3 \\ S3_0 & \Delta\lambda_3*S3_0 & S3_1 & \Delta\lambda_3*S3_1 & S3_2 & \Delta\lambda_3*S3_2 & S3_3 & \Delta\lambda_3*S3_3 \\ S4_0 & \Delta\lambda_4*S4_0 & S4_1 & \Delta\lambda_4*S4_1 & S4_2 & \Delta\lambda_4*S4_2 & S4_3 & \Delta\lambda_4*S4_3 \\ S5_0 & \Delta\lambda_5*S5_0 & S5_1 & \Delta\lambda_5*S5_1 & S5_2 & \Delta\lambda_5*S5_2 & S5_3 & \Delta\lambda_5*S5_3 \\ S6_0 & \Delta\lambda_6*S6_0 & S6_1 & \Delta\lambda_6*S6_1 & S6_2 & \Delta\lambda_6*S6_2 & S6_3 & \Delta\lambda_6*S6_3 \\ S7_0 & \Delta\lambda_7*S7_0 & S7_1 & \Delta\lambda_7*S7_1 & S7_2 & \Delta\lambda_7*S7_2 & S7_3 & \Delta\lambda_7*S7_3 \end{vmatrix} * \begin{vmatrix} P0 \\ P1 \\ P2 \\ P3 \\ P4 \\ P5 \\ P6 \\ P7 \end{vmatrix} \quad \text{Eq.(5)}$$

In equation (5) $m_{0,k}$ where k=0–3, are the top elements of the Mueller matrix at the start wavelength and $\Delta_{0,k}$ are the slopes of the Mueller matrix, i.e., the change in magnitude of the Mueller matrix element divided by the change in wavelength, with the slope assumed to be linear over the wavelength range covered by the eight measurements. As with equation (3) the Stokes matrix is not singular—it has an inverse if the states of polarization are not co-planar.

The advantages of the above-described procedure are that: (i) the system measures PDL in a single sweep, as opposed to the standard configuration that required a sweep for each measurement, so that for example a PDL measurement may be made in six seconds instead of 24 seconds; (ii) the polarization scan module (PSM) may be made with no moving parts where the polarimeter 18 is made using a fiber loop and fiber Bragg gratings in a feedback loop with a solid-state polarization controller (active configuration) using piezoelectric squeezers, resulting in increased reliability and mean time between failures; (iii) the PSM and polarimeter, being composed of all optical components, are capable of being packaged in a small volume, such as a single-wide cPCI module; and (iv) the power requirements are low since the PSM (all-passive configuration) requires no electrical power and the polarimeter requires only enough power to operate the photodetectors in the polarimeter.

What is claimed is:

1. A polarization scan module comprising:
 a swept-wavelength optical source providing a light signal that sweeps over a range of optical wavelengths, the light signal having a state of polarization; and
 means for rotating the state of polarization over a Poincare sphere as the light signal changes wavelength within the range to produce a test optical signal.

2. The polarization scan module as recited in claim 1 wherein the rotating means comprises an active polarization controller interacting with the light signal to change the state of polarization as a function of optical wavelength to produce the test optical signal.

3. The polarization scan module as recited in claim 2 wherein the active polarization controller comprises means for changing the state of polarization sequentially and cyclically over the range of wavelengths.

4. A polarization scan module comprising:
a swept-wavelength optical source providing a light signal that sweeps over a range of optical wavelengths, the light signal having a state of polarization; and
a first optical stage having a first eigenstate to which the light signal is input, the state of polarization being oriented at a first angle with respect to the first eigenstate, and providing a first output light signal; and
a second optical stage having a second eigenstate to which the first output light signal is input, the first eigenstate and second eigenstate being oriented at a second angle relative to each other, and providing a second output light signal as a test optical signal, the relative optical lengths and orientations of the two optical stages being such as to cause the state of polarization to rotate over a Poincare sphere as the light signal changes wavelength within the range to produce the test optical signal.

5. The polarization scan module as recited in claim 4 wherein the first and second angles each comprise an approximately forty-five degree angle.

6. The polarization scan module as recited in claims 4 or 5 wherein the relative optical lengths comprise a factor of the square root of two.

7. The polarization scan module as recited in claim 4 wherein the first optical stage comprises a first polarization maintaining fiber having a first optical length, with the light signal as an input and the first output light signal as an output.

8. The polarization scan module as recited in claim 7 wherein the second optical stage comprises a second polarization maintaining fiber having a second optical length equal to the first optical length times a factor that causes the state of polarization to rotate over the Poincare sphere as the wavelength changes, with the first output light signal as an input and the second output light signal as an output.

9. The polarization scan module as recited in claim 8 wherein the factor comprises the square root of two.

10. The polarization scan module as recited in claim 4 wherein the first optical stage comprises:
a first optical splitter having the light signal as an input and providing two orthogonal polarization state light signals as outputs; and
a first optical multiplexer for combining the two orthogonal polarization state light signals to provide the first output light signal, with the optical paths between the first optical splitter and the first optical multiplexer for the orthogonal polarization state light signals having a first difference in optical length.

11. The polarization scan module as recited in claim 10 wherein the second optical stage comprises:
a second optical splitter having the first output light signal as an input and providing two orthogonal polarization state light signals as outputs; and
a second optical multiplexer for combining the two orthogonal polarization state light signals to provide the second output light signal, with the optical paths between the second optical splitter and the second optical multiplexer for the orthogonal polarization state light signals having a second difference in optical length, the first and second differences being related by a factor such that the state of polarization rotates over the Poincare sphere as the wavelength changes.

12. The polarization scan module as recited in claim 11 wherein the factor comprises the square root of two.

13. A single sweep polarization dependent loss measurement system comprising:

means for rotating a state of polarization for a light signal over a Poincare sphere as the light signal sweeps over a range of optical wavelengths;
means for measuring an optical power for the state of polarization at four different orientations within the range of optical wavelengths at both an input and an output of an optical component being tested; and
means for computing polarization dependent loss for the optical component as a function of the measured optical powers and corresponding known wavelengths of the state of polarization at the four different orientations.

14. The system as recited in claim 13 wherein the rotating means comprises:
a tunable laser for providing the swept light signal; and
a polarization controller having the light signal as an input and providing sequential and cyclical states of polarization for the light signal over the range of optical wavelengths.

15. The system as recited in claims 13 or 14 wherein the measuring means comprises:
a fast polarimeter for measuring the state of polarization at the input of the optical component; and
an optical power meter for measuring the optical power at the output of the optical component.

16. The system as recited in claim 13 wherein the rotating means comprises:
a first optical stage having a first eigenstate to which the light signal is input, the state of polarization being oriented at a first angle with respect to the first eigenstate, and providing a first output light signal; and
a second optical stage having a second eigenstate to which the first output light signal is input, the first eigenstate and second eigenstate being oriented at a second angle relative to each other, and providing a second output light signal, the relative optical lengths and orientations of the two optical stages being such as to cause the state of polarization to rotate over the Poincare sphere as the light signal changes wavelength.

17. A method of measuring polarization dependent loss using a swept-wavelength optical source comprising the steps of:
at a start optical wavelength of a light signal from the optical source measuring a state of polarization and transmitted optical power at an input and output of an optical component being tested;
changing the state of polarization for the light signal at a new optical wavelength so as to cause the state of polarization to rotate over a Poincare sphere;
measuring the state of polarization and transmitted optical power for the optical component at the input and output at the new optical wavelength;
repeating the changing and measuring steps until sufficient different states of polarization and transmitted optical powers are measured to provide a set of measurement data; and
calculating from the set of measurement data the polarization dependent loss for the optical component.

18. The method as recited in claim 17 wherein the sufficient different states of polarization comprise at least four different states of polarization.

19. The method as recited in claim 17 wherein the sufficient different states of polarization comprise at least eight different states of polarization when polarization dependent loss changes during changes of the optical wavelength over a sweep range.

20. A single sweep polarization dependent loss measurement system comprising:
  a polarization rotator that rotates a state of polarization for a light signal over a Poincare sphere as the light signal sweeps over a range of optical wavelengths;
  a detector system that measures an optical power for the state of polarization at four different orientations within the range of optical wavelengths at both an input and an output of an optical component being tested; and
  a processor that computes polarization dependent loss for the optical component as a function of the measured optical powers and corresponding known wavelengths of the state of polarization at the four different orientations.

21. The system as recited in claim 20 wherein the polarization rotator comprises:
  a tunable laser for providing the swept light signal; and
  a polarization controller having the light signal as an input and providing sequential and cyclical states of polarization for the light signal over the range of optical wavelengths.

22. The system as recited in claims 20 or 21 wherein the detector system comprises:
  a fast polarimeter for measuring the state of polarization at the input of the optical component; and
  an optical power meter for measuring the optical power at the output of the optical component.

23. The system as recited in claim 20 wherein the polarization rotator comprises:
  a first optical stage having a first eigenstate to which the light signal is input, the state of polarization being oriented at a first angle with respect to the first eigenstate, and providing a first output light signal; and
  a second optical stage having a second eigenstate to which the first output light signal is input, the first eigenstate and second eigenstate being oriented at a second angle relative to each other, and providing a second output light signal, the relative optical lengths and orientations of the two optical stages being such as to cause the state of polarization to rotate over the Poincare sphere as the light signal changes wavelength.

* * * * *